Figure 1:
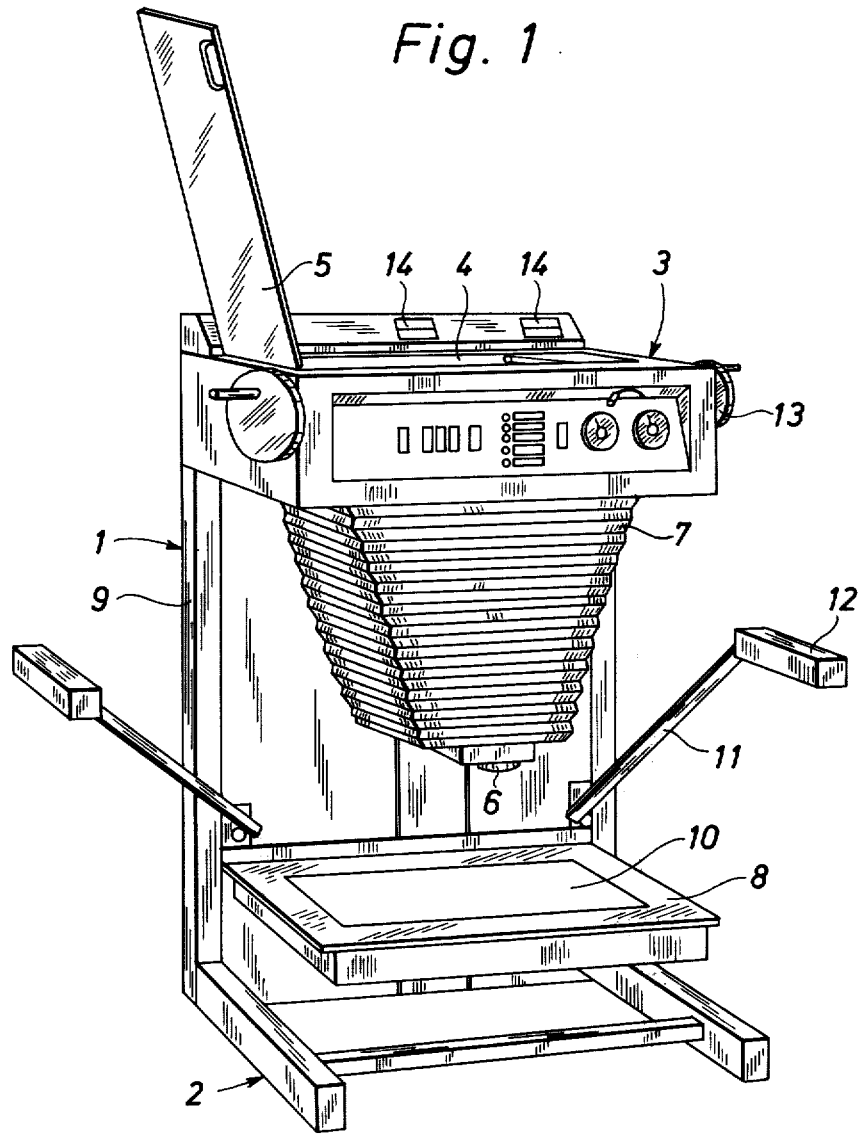

United States Patent

Nygaard et al.

[11] 3,938,887
[45] Feb. 17, 1976

[54] REPRODUCTION CAMERA

[75] Inventors: Sven Nygaard, Nykobing Falster; Rex Stemann Larsen, Rodovre, both of Denmark

[73] Assignee: Eskofot A/S, Ballerup, Denmark

[22] Filed: Sept. 21, 1973

[21] Appl. No.: 399,519

[30] Foreign Application Priority Data
Oct. 16, 1972 Denmark............................ 5103/72

[52] U.S. Cl. ............................................... 355/63
[51] Int. Cl.² ......................................... G03B 27/62
[58] Field of Search ............ 355/55, 56, 62, 63, 75, 355/74

[56] References Cited
UNITED STATES PATENTS

| | | | |
|---|---|---|---|
| 1,365,688 | 1/1921 | Hastings | 355/62 X |
| 2,846,920 | 8/1958 | Freidel | 355/62 X |
| 3,207,030 | 9/1965 | Polland | 355/62 X |
| 3,308,714 | 3/1967 | Freidel | 355/62 X |

*Primary Examiner*—Richard M. Sheer
*Assistant Examiner*—Alan Mathews
*Attorney, Agent, or Firm*—Cushman, Darby & Cushman

[57] ABSTRACT

A reproduction camera having a movable table which at two adjacent corners is guided in two vertical guides on the frame of the camera and moved by an endless cord which is passed over cord pulleys arranged above and below said guides, the endless cord being further passed over a winding drum and connected to the said movable table in such manner that the two connecting points are moved in the same direction when the cord is moved, whereby a very exact translatory movement of the table is obtained by a very simple mechanism which is easy to manufacture and to operate.

2 Claims, 2 Drawing Figures

U.S. Patent   Feb. 17, 1976   Sheet 1 of 2   3,938,887

REPRODUCTION CAMERA

The invention relates to a reproduction camera of the kind having a frame which carries a fixed table with a supporting plate, preferably a glass plate, for a light-sensitive sheet, and another table with a supporting plate, preferably a glass plate, for a photographic object such as a drawing or a document, the said latter table being displaceable parallelly in vertical direction toward and away from the former table.

In such a reproduction camera, which is usually used for making enlargements or reductions of available objects such as drawings and documents, it is of essential importance that the movable table may be moved easily up and down and in particular in such manner that it is a pure parallel displacement, since even very small misalignments will have an adverse effect on the photographic exposure.

In the known cameras of the aforesaid kind rather complicated operating members such as spindles or toothed racks have been used for displacing the movable table in parallel, and since the driving member, usually a handwheel, has to be provided at a convenient location of the frame, the mechanism is a rather bulky and relatively heavily operable one which enhances the cost of manufacturing the apparatus. An essential feature of the reproduction camera according to the present invention is that the parallelly displaceable table at two adjacent corners is guided in two vertical guides on the frame, cord pulleys being provided at each guide above and below, and an endless cord passed over all the cord pulleys and further over a winding drum, the said cord being connected with the table in such manner that the two connecting points are moved in the same direction when the cord is moved.

By means of this design the operating mechanism obtained is very simple, easy to manufacture and easy to operate, and it is capable of giving a very exact translatory movement of the table.

In a convenient embodiment counterweights may be inserted in the cord runs that have no connection with the table, so that it becomes very easy to move the table.

The winding drum may according to the invention consist of a shaft with a helical groove in which the cord is wound a number of times. By a suitable tension of the cord, which may appropriately be a steel wire, it will be possible to obtain a movement of the cord wholly without slip with consequent translatory movement of the table.

The invention will now be described with reference to the drawing, in which

Figure 2:
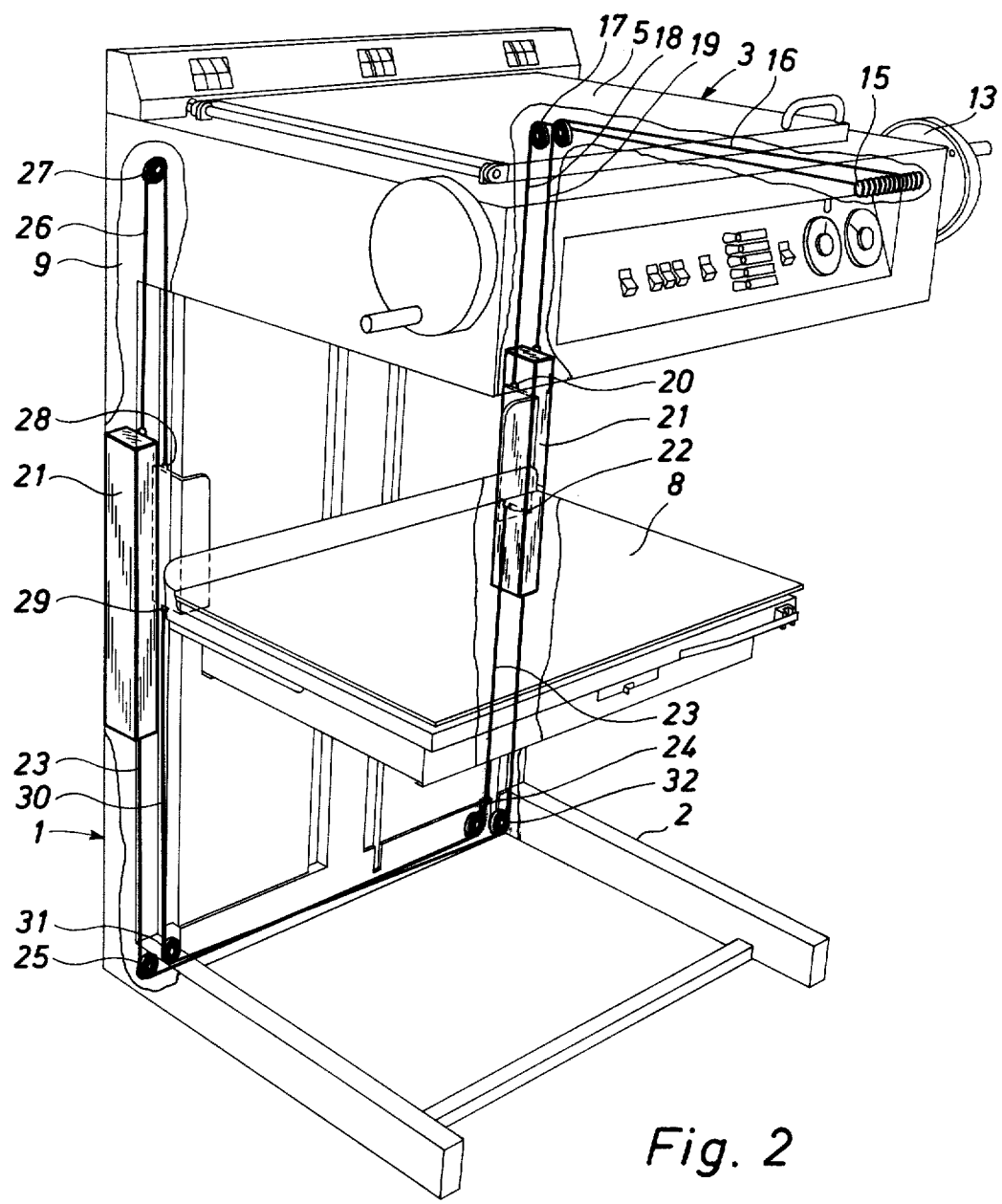

FIG. 1 shows a reproduction camera according to the invention, viewed in perspective, and FIG. 2 a diagrammatic representation of the driving means for the movable table.

The camera according to FIG. 1 consists of a frame 1 supported by a base 2 and having at its upper end a fixed table 3 with a glass plate 4 which is adapted for the arrangement of a sheet of light-sensitive material. A lid 5 is adapted to be lowered on the glass plate 4 so as to retain the sheet.

A photographic lens 6 is carried by bellows 7 and may be moved upwards and downwards. Beneath the lens is a table 8 resting in two vertical guides formed by columns 9 of the frame. The table may thus be moved upwards and downwards, that is, toward and away from the lens 6. The table 8 carries a glass plate 10 on which may be deposited a photographic object such as a drawing or a document to be photographed, that is, projected through the lens 6 onto the glass plate 4.

Illuminators 12 mounted on swingable arms 11 are adapted to illuminate the photographic object lying on the table 8.

When the camera is to be adjusted, the table 8 is moved vertically by means of a handwheel 13 which drives the cords shown in FIG. 2.

The vertical positions of the lens 6 and the table 8 may be read on graduated scales 14.

As will appear from FIG. 2, the handwheel 13 is permanently connected with a shaft 15 which has a helical outer groove in which is passed an endless cord 16 wound several times on the shaft 15 in grooves lying side by side and then passed over two pulleys 17 at the upper end of one column 9. From the pulleys 17 the two runs 18 and 19 of the cord are passed downwards. The cord run 18 is attached at 20 to a member of the table 8 and the cord run 19 is attached to a counterweight 21. From a point 22 of the member connected with the table emanates a cord portion 23 which is passed over a pulley 24 at the lower end of the column 9 and hence in horizontal direction to a pulley 25 at the lower end of the left-hand column 9.

From the pulley 25 the cord portion 23 is passed upwards and connected with a counterweight. At the upper end of the apparatus the counterweight is connected with a cord portion 26 which is passed over a pulley 27 above and downwards from here to a point of attachment 28 of a member connected with the table 8. From the lower end of the said member emanates a cord portion 30 from a point 29; the said cord portion is passed down over a pulley 31 beside the pulley 25 and hence horizontally to a pulley 32 beside the pulley 24 and upwards again from same as it is connected with the lower portion of the counterweight 21.

The said cord portions constitute together an endless cord, consisting appropriately of a steel wire, and if adequately tensioned the system will be absolutely without slip.

When the shaft 15 is turned in clockwise direction as viewed in FIG. 2, the cord portion 18 will move downwards and the cord portion 19 upwards. The said movements will be transmitted through the cord portions 23, 26 and 30 to the other side of the table 8 and at the same time the points 20, 22, 28 and 29 will be lowered, that is, the table 8 will be lowered in a pure translatory movement, whilst the counterweights 21 will be raised correspondingly.

When the shaft 15 is turned in the opposite direction, the table 8 will be raised and the counterweights 21 be lowered.

We claim:

1. A reproduction camera comprising:
   a frame,
   a fixed table carried by said frame and having a supporting plate for a light-sensitive sheet,
   two vertical guide members on said frame at adjacent corners of said frame,
   first and second counterweights,
   two pairs of cord pulleys associated with one of said guide members, one of said pair being mounted above and the other of said pair being mounted below said one of said guide members, a third pair of cord pulleys and a single pulley associated with the other of said guide members, said third pair being mounted below the other of said guide members and said single pulley being mounted above said other guide member, and a winding drum mounted on said frame for rotation, means attached to said drum member for manual rotation thereof, an endless cord wound several times on said drum, a movable table, said cord extending from said drum to and engaging one of said pulleys mounted above said one guide member, and then vertically downwardly past said one guide member and fixedly attached to said movable table, and then to and engaging one of said pulleys mounted below said one guide member and then horizontally to and engaging one of said pulleys below said other guide member, and then vertically past said other guide member and attached to one of said counterweights, and then vertically to and engaging said single pulley, and then vertically past said other guide member and fixedly attached to said movable table and then to and engaging the other pulley below said other guide member and then horizontally to and engaging the other pulley below said one guide member and then vertically past said one guide member and attached to the other of said counterweights and then to and engaging the other pulley above said one guide member and then to said drum, so that rotation of said drum in one direction raises said counterweights and lowers said movable table and rotation of said drum in the opposite direction lowers said counterweights and raises said movable table.

2. A camera as claimed in claim 1 wherein said winding drum consists of a shaft with a helical groove in which the cord is laid in a number of windings.

* * * * *